United States Patent [19]
Layton et al.

[11] Patent Number: 5,439,027
[45] Date of Patent: Aug. 8, 1995

[54] HIGH PRESSURE REGULATING VALVE

[75] Inventors: Ken S. Layton, Fayetteville, Ark.; Mark L. Suttle; Brett L. Tisch, both of Duncan, Okla.

[73] Assignee: Halliburton Company, Duncan, Okla.

[21] Appl. No.: 184,725

[22] Filed: Jan. 21, 1994

[51] Int. Cl.[6] ............................................. F16K 17/02
[52] U.S. Cl. ................. 137/513.5; 137/514.7; 137/528; 251/122
[58] Field of Search ............... 137/513.5, 514, 514.7, 137/528; 251/122

[56] References Cited

U.S. PATENT DOCUMENTS

| | | | |
|---|---|---|---|
| 5,065,789 | 11/1991 | Eslinger | 137/513.5 |
| 5,097,864 | 3/1992 | Myers | 137/528 |
| 5,127,807 | 7/1992 | Eslinger | |

*Primary Examiner*—Robert G. Nilson
*Attorney, Agent, or Firm*—Stephen R. Christian

[57] ABSTRACT

A high pressure poppet-type regulating valve for controlling fluids that have been pressurized up to approximately 20,000 psi (1,400 kg/cm$^2$). In the preferred embodiment the disclosed gas-dampened valve includes a stainless steel tapered poppet which is slidably positioned within a bore of a stainless steel valve body having an integral tapered valve seat. A portion of the poppet has at least one tapered section having a preselected taper angle. The valve seat has a preselected taper as well. Preferably the tapered section of has a taper angle that is up to approximately 10% larger the taper angle of the valve seat to reduce erosion of the poppet and seat thereby allowing the poppet to be made of stainless steel in lieu of a more wear resistant material. The valve body of the preferred embodiment further includes opposed discharge ports for minimizing pressure imbalances thereby reducing cavitation-induced damage to the valve. Additionally, an optional protective sleeve may be installed about a straight cylindrical discharge portion of the poppet to further minimize cavitation induced damage to the valve.

20 Claims, 3 Drawing Sheets

HIGH PRESSURE REGULATING VALVE

BACKGROUND OF THE INVENTION

This invention relates to an improved back pressure regulating valve for use with pumps such as high pressure water jetting pumps, and more particularly to valves suitable for applications utilizing an elongated tapered poppet and an accommodating poppet seat to reduce fluid velocity in the valve and having a gas charged actuator with a damping chamber.

Hydraulic jetting, wherein fluid such as water, is pumped at high pressures through jetting nozzles, is used for a variety of applications such as cleaning of industrial equipment, heat exchangers, and boilers. Hydraulic jetting is also used for drilling and cutting a large variety of materials.

In many hydraulic jetting applications, one or more hand-operated, or machine-operated lances, or nozzles, are used. The operators normally trigger these lances on and off many times during a jetting operation. Thus, a highly responsive flow control device is needed to modulate flow from such a pump being used to pressurize the water, or other liquid, that is being used on demand in a particular jetting application. An illustrative pump is disclosed in U.S. Pat. No. 5,127,807 which is particularly suitable for providing pressures up to 20,000 psi (1,400 kg/cm$^2$). For applications requiring working pressures of approximately 10,000 psi (700 kg/cm$^2$) or less, plunger style pumps such as HT-150 and HT-400 plunger style pumps available from Halliburton Energy Services, a division of the assignee hereof, are commercially available. Additionally, there are a variety of commercially available pumps of various designs suitable for a wide variety of applications requiring such a flow control device.

In practice, it is required that the flow control device be able to maintain a substantially constant system pressure in response to significantly changing flow rates. Thus it is desired that the flow control device be able to endure, or better yet, avoid the destructive effects of the flow of liquid through the flow control device at speeds ranging from near sonic to supersonic. A representative priorly known flow control device is disclosed in U.S. Pat. No. 5,065,789 assigned to the assignee hereof, and which is incorporated herein as a reference.

Priorly known flow control valve devices, including the poppet-type valve disclosed in U.S. Pat. No. 5,065,789, are susceptible to erosive wear to various degrees, depending on the particular valve. Thus, there remains a need within the art to further reduce the amount of erosive wear experienced by poppet-type valves when operating at pressures ranging from 0 to 20,000 psi (1,400 kgs/cm$^2$).

There also remains a need for a poppet-type valve which can be manufactured with fewer components than previously required in the construction of priorly known valves.

There also remains a need for components made with less expensive materials as compared to the materials required to construct components for priorly known poppet-type valves.

There further remains a need for a poppet-type valve in which tolerances between certain components are not as critical as compared to the tolerances required with previously known valves.

These needs and others are fulfilled by the present invention disclosed herein.

SUMMARY OF THE INVENTION

The back pressure regulating valve of the present invention is adapted for high pressure pumping systems and includes a valve body having a central axis and a centrally located opening extending therethrough. The opening has an inlet and a tapered section. The tapered section forms an elongated tapered opening having a preselected taper angle with respect to the central axis and defines a seat surface integral to the valve body. The valve body opening includes an inlet at a first end, and at least one discharge port at a preselected longitudinal position along the valve body. In the preferred embodiment the valve body includes at least two discharge ports positioned in a perpendicular relationship to each other. The regulating valve further includes a poppet having a longitudinal axis centered about the centerline of the valve body when installed. The poppet further has a first leading tip portion, a second intermediate portion, a third portion, and a fourth portion encompassing the remainder of the poppet. The second intermediate portion forms an elongated tapered poppet surface having a preselected taper angle with respect to the central longitudinal axis which differs from the preselected taper angle of the seat surface in the valve body by a preselected amount. At least a portion of the second intermediate portion of the poppet is slidably disposed within the second section of the elongated tapered opening of the valve body thereby defining a flow path therebetween. The flow path has a preselected nominal length with respect to the longitudinal axis. A biasing means for biasing the poppet toward the seat is also provided and means for limiting the movement of the poppet from the integral seat is provided as well. The third portion of the poppet is preferably of a straight, cylindrical cross-section, however the third portion may alternatively be tapered initially with the remainder of the third portion being of a substantially straight cylindrical cross-section. A guide sleeve is fitted over at least a portion of the third portion of the poppet. Lastly, a gas filled actuator having a piston therein is fitted to the valve body for providing a means for damping the movement of the poppet within the valve body.

DESCRIPTION OF THE DISCLOSED INVENTION

Figure 1:
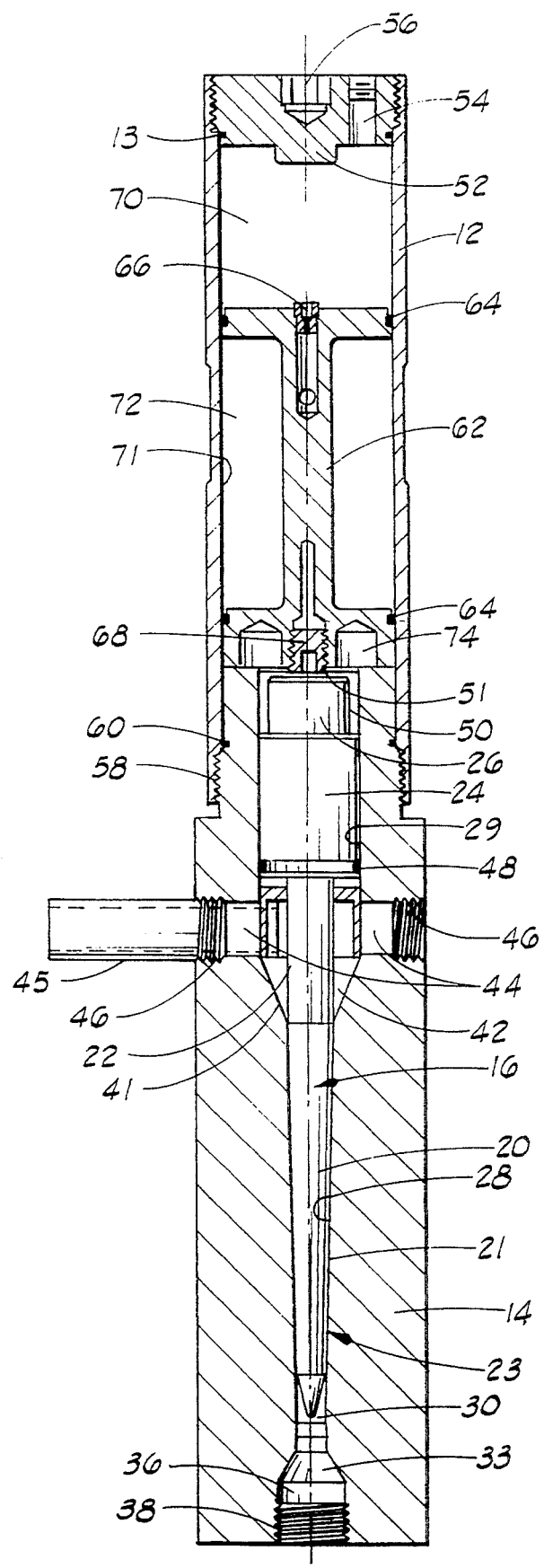
FIG. 1 of the drawings is a cross-sectional view of the preferred embodiment of the disclosed regulating valve.

Referring now to FIG. 1 of the drawings. FIG. 1 shows an embodiment of the disclosed high pressure relief valve assembly 10 which is connectable to a high pressure fluid pump for regulating the pressure generated thereby in the performance of jetting operations for example. Valve 10 is particularly suitable for operating within a pressure range of 0 to 20,000 psi (1,400 kg/cm$^2$).

Valve 10 includes a tubular actuator body 12, preferably made of 4140 steel or other suitable material, and a compatible valve body 14, preferably made of 17-4 stainless steel or other suitable material. Valve body 14 accommodates a tapered poppet or plunger 16, preferably made of 17-4 stainless steel. Poppet 16 is installed within a poppet bore 23 which is centrally located about a center reference line which is common to valve body 14, actuator body 12, and poppet 16. Bore 23 is defined by tapered surface 28 having a predetermined angle with respect to the center reference line. The predetermined angle of tapered surface 28 is shown as angle Beta in FIG. 2 of the drawings. Bore 23 is integral to valve body 14 and thus does not require a separate valve seat that must be manufactured of an expensive very high strength alloy material to close tolerances to allow the separate valve seat to be fitted into a separate valve body as taught by prior art valves. Poppet 16 is provided with a relatively highly tapered first inlet tip section, or portion 18, a second intermediate tapered section, or portion 20, a third straight guide section or portion 22, and a fourth straight end section, or portion 26. The surface of intermediate section 20 is denoted as surface 21. The predetermined angle of tapered surface 21 is shown as angle Alpha in FIG. 2 of the drawings.

Poppet 16 is tapered and sized to be slidably inserted into, and to slidably operate within bore 23. Section 22 of poppet 16 differs from conventional poppets in that this particular section of the poppet has a straight cylindrical geometry as contrasted with having an initially tapered section which transitions into a straight cylindrical geometry toward the actuator. By utilizing the straight cylindrical profile of the preferred poppet, the possibility of fluid cavitation during near-sonic, and super-sonic speeds is minimized.

Figure 2:
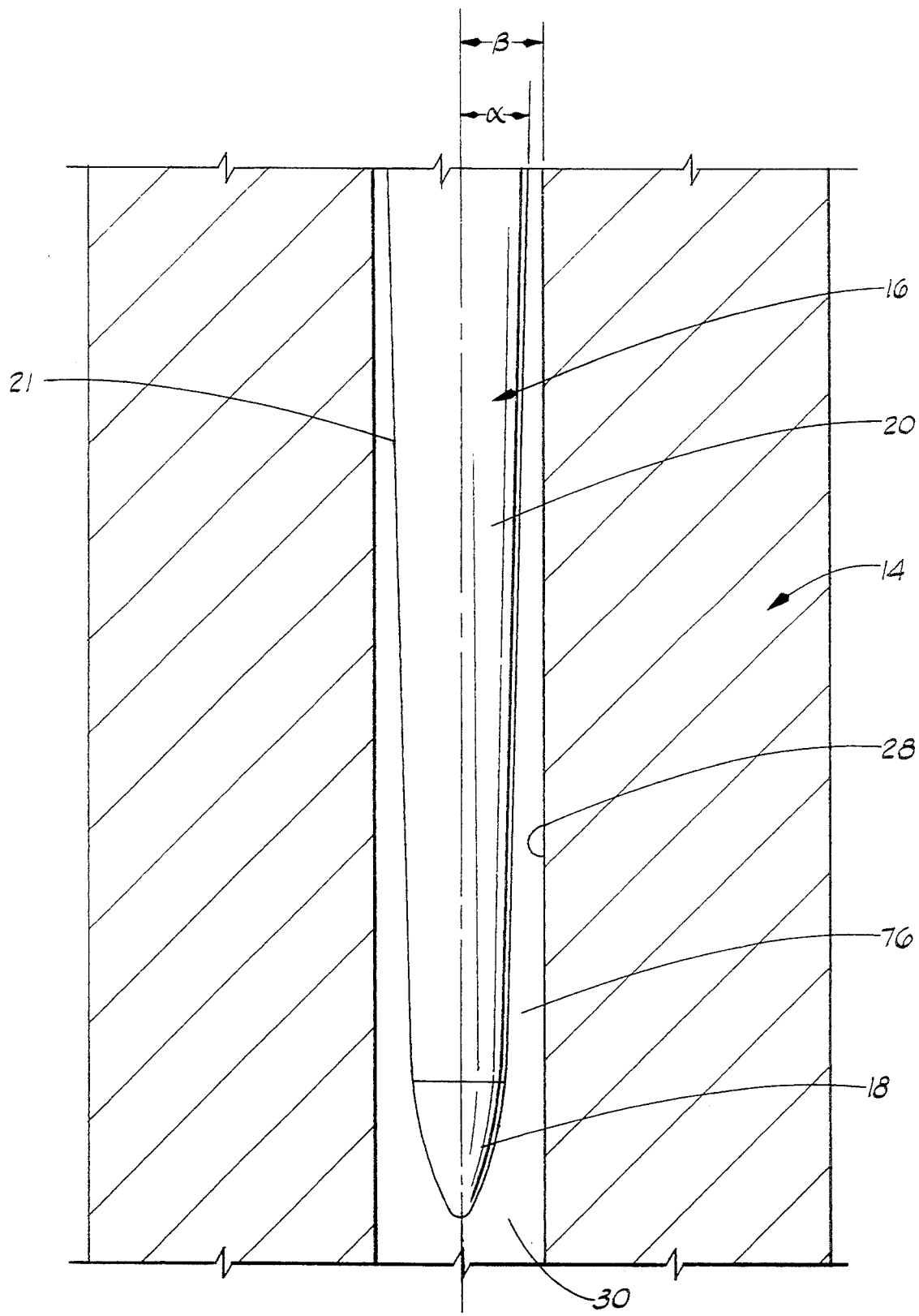
FIG. 2 of the drawings is an isolated cross-sectional view of the intermediate tapered portion of the poppet and corresponding integral valve seat in the valve body.

Unlike prior art high pressure poppet valves that have matching tapers, tapered surface 28 of valve body 14 and surface 21 of intermediate poppet section 20 have respective tapers with respect to the common center line which are mismatched by a certain amount. Preferably, the taper of poppet surface 21 is up to 10% greater than the taper of bore surface 28. The amount of mismatch may range from approximately 0 to 0.1 degrees with a mismatch of approximately 0.035 degrees being most suitable for operating pressures and flow rates most likely to be encountered. This relationship can also be expressed as a percentage of mismatch which would preferably be approximately 40%. As mentioned above, FIG. 2 of the drawings depicts an angle Alpha, which is the relative angle between the centerline and surface 21 of poppet section 20, and an angle Beta, which is the relative angle between tapered surface 28 of valve body bore 23 and the centerline. The difference in the angles can easily be found by subtracting the angle beta from angle Alpha. Also shown in FIG. 2, is an exaggerated gap 76 between poppet surface 21 and bore surface 28 which defines a fluid flow path between the poppet and the bore which extends longitudinally from inlet region 30 to outlet opening 44.

A guide or bearing sleeve 24 made of commonly available lead-bronze alloy is press-fitted over section 22, section 26, or both, to centralize and provide a bearing surface between poppet 16 and an essentially non-tapered surface 29 of bore 23. It is possible to provide a step in section 22 to a larger outside diameter in the surface of section 22 toward section 26 so as to minimize the amount of material removal in the machining of poppet 16. However, it is not necessary to do so, as the primary concern is that guide or bearing sleeve 24 be sufficiently secure and aligned upon the respective end of poppet 16 upon which it is being attached regardless of the exact profile and outside dimensioning of the poppet thereunder.

The difference in diameters of surface 29 and exposed region of section 26 that is not covered by bushing 24 results in a cavity 50. Cavity 50 is sealed from pressurized fluid by seal 48 which resides in a groove about bushing 24.

Bore 23 has a flared transition surface 41 between tapered surface 28 and straight surface 29 forming a transition region 42 which allows pressurized fluid to transition from the restricted flow path 76 to outlet, or discharge openings 44 and through opposing outlet ports 46, each of which are preferably threaded to accommodate a respective discharge fitting 45. By having opposing discharge openings and ports, a better discharge pressure balance is obtainable in comparison to prior art regulating valves having discharge ports in a perpendicular arrangement. By employing such opposing discharge ports, the more equal pressure balance will provide a more even distribution of wear on adjacent poppet section 22 when pressurized fluid experiences cavitation in the region. Notwithstanding the benefits offered by providing an opposed discharge port arrangement, it may be desired to include a protective cup, or sleeve, 43 about a portion of poppet portion 22, in which cup 43 has perpendicular openings therein for allowing fluid to be discharged directly into fittings 45. Preferably optional cup 43 is made of 17-4 stainless steel for example, and the perpendicular openings allow fittings 45 to protrude slightly thereinto for holding cup 43 in position. Optional protective cup 43 serves to protect poppet section 22 from fluid cavitation induced damage and in the structure around discharge opening 44 under extreme operating conditions. If protective cup 43 is not used, fitting 45 need not extend inward toward the discharge opening 44 as much as shown in FIG. 1.

Referring now to the inlet region of valve body 14, an inlet region 30 surrounding tapered tip 18 of poppet 16 is provided. Inlet region 30 is in communication with flared inlet region 33 which is in turn in communication with inlet opening 36. Opening 36 is preferably provided with a threaded inlet fitting port 38 to accommodate inlet fittings of desired sizes and configurations.

Referring now to actuator body 12 and actuator piston 62. Recessed cavities 74 in actuator piston 62 provide a location for stray fluid to collect that may find its way past poppet seal 48 or piston seals 64. A drain or vent is placed in communication with cavities 74 to allow such unwanted fluid to exit the actuator housing. Such a vent is not shown in FIG. 1 because it is positioned underneath actuator piston 62 and is thus obscured thereby. However, a representative vent 52 is shown in the alternative valve 10' shown in FIG. 3 which is viewable due to a differing discharge opening 44' arrangement which happens to allow the vent to be positioned as shown.

Returning to FIG. 1, an O-ring seal 13 provides a means to seal actuator cap 52 about actuator bore 71. Actuator cap 52 is preferably threadedly engaged with actuator body 12 and has wrench access 56 facilitating such engagement. A pressure port 54 is provided for introducing a pressurized gas into first damping chamber 70. Actuator piston 62 is slidably disposed within actuator bore 71 and O-ring seals 64 provide a means for isolating chamber 70 with second damping chamber 72.

Actuator piston 62 is provided with a orifice 66 for tuning the pressure induced transfer of gas between chambers 70 and 72 when the valve is in operation. Adjustable stop 68 provides a means for preselecting a stop point for poppet end 51 thereby limiting the amount of longitudinal travel of poppet 16 in bore 23 of valve body 14 and to prevent poppet 16 from sticking in bore 23. Actuator body 12 threadedly engages with valve body 14 at threaded joint 58 and O-ring seal 60 provides a means for sealing joint 58.

Figure 3:
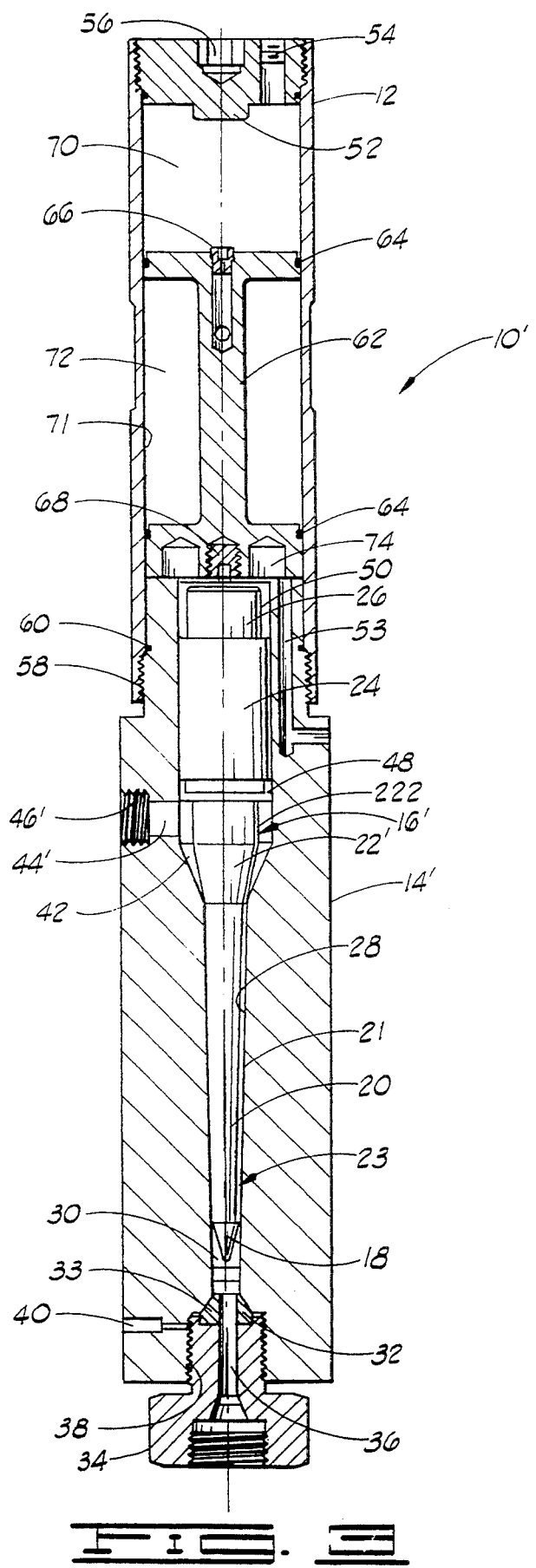
FIG. 3 of the drawings is a cross-sectional view of an alternative embodiment of the disclosed regulating valve having conventionally arranged discharge ports and an alternative poppet positioned therein.

Referring now to FIG. 3 of the drawings. An alternative embodiment of the disclosed regulating valve is shown and is generally referred to as 10'. The difference between the preferred embodiment and the alternative embodiment resides in poppet 16' having a third section 22' having an initial taper which eventually leads into an enlarged straight cylindrical section 222. An additional difference between the alternative valve 10' resides in the valve having a perpendicular discharge opening arrangement 46' and 44' as depicted in FIG. 3 and in the prior art, in lieu of the novel opposed discharge port arrangement, as shown in FIG. 1, when two or more such openings are employed.

Furthermore, valve body 14' shown in FIG. 3 includes a representative inlet fitting 34 that has been installed into inlet port 38. Valve body 14' also includes a drain 40 for allowing unwanted fluid to exit inlet area 33 which may house an inlet seal 32. Likewise, a drain 53 is shown in valve body 14' for relieving any fluid that may find its way past piston 62 and collect in recess 74.

Operation Of Disclosed Invention

The disclosed high pressure regulating valve is assembled and operated in accordance with standard practices within the art, however, a brief description of such operation follows.

Although not limited to such dimensions, the following dimensions are provided for illustrating an exemplary dimensional scale of a valve constructed in accordance with the disclosed invention.

Poppet 16 was provided with a nominal diameter of approximately 0.8 inches (20 mm) about portion 22, and valve body bore 28 had a nominal diameter of approximately 0.8 (20 mm) inches just prior to transition region 41. The overall length of valve body 14 was approximately 15 inches (37.5 cm) and the overall length of actuator body 12 was approximately 12 inches (30 cm). Actuator piston had a nominal outside diameter of approximately 3 inches (7.5 cm) with an overall length of approximately 6 inches (15 cm).

After bearing 24 has been press-fitted or otherwise installed on poppet 16, and seal 48 has been installed thereabout, poppet 16 is inserted into integral bore, or valve seat, 23. As mentioned above, by utilizing an integral bore 23, the added expense of designing, manufacturing, and fitting an insertable poppet seat, as taught by the prior art, is avoided. Furthermore, with the disclosed valve, the valve body may be made of stainless steel rather than a more expensive alloy because of the improved wear characteristics resulting from the mismatched angles of poppet portion 20 and seat bore 28. This improved wear feature is believed to be attributable to the increased volume of the fluid flow path proximate to tip portion 18, tapered section 20, and valve seat 28, which effectively reduces the peak velocity of the fluid, at the expense of increasing the average velocity of the fluid, in the subject region. This mismatch of tapers thus minimizes destructive cavitation and erosion that would otherwise be present with higher peak fluid velocities.

Actuator piston 62 having an adjustable stop, which is longitudinally adjusted by a threaded screw, is seated against valve body 14 and stop screw 68 is adjusted so as to provide a desired clearance between the stop and end 51 of poppet 16. Normally the clearance is few thousandths of an inch, with approximately 0.06 inches (1.5 mm) being an exemplary clearance for preventing undesired sticking of poppet 16 within bore 28.

Actuator body 12 is joined to valve body 14 at joint 58 by installing O-ring 60 and threading and cinching together actuator body 12 and valve body 14. Actuator piston 62 is then installed with O-rings 64 in place and orifice 66 being pre-installed in place. Orifice 66 is typically a threaded orifice with an internal diameter of a preselected size that is particularly suitable for the operating pressures to be encountered and the particular gas to be utilized in the actuator. An exemplary orifice size is 0.06 inches (1.5 mm), however, any orifice size may be used to suit a particular application. Actuator cap 52 may then be installed with O-ring 13 pre-installed thereabout. Appropriate discharge fittings 45 and an inlet fitting such as fitting 34 shown in FIG. 3, having suitable flow rates and configurations may be installed.

Chambers 70 and 72 in actuator housing 12 are eventually charged with preferably an inert gas such as nitrogen or air by way of charge port 54 to a preselected pressure after the pumps pressurizing the fluid is brought on line. By charging the actuator after bringing the fluid pressurizing pump, or pumps, on line, the nitrogen, or air, charge can be increased until the desired fluid operating pressure is obtained. The charge pressure can then be noted and monitored for determining what the charge pressure should be to maintain a desired fluid operating pressure. It is also preferred to release the actuator gas from the actuator prior to shutting down the fluid pressurizing pumps during routine operations. However, during an emergency shut down the pump may be shut down prior to releasing the gas charge within the actuator. An actuator gas charge of nitrogen of approximately 450 psi (32 kg/cm$^2$) is exemplary for maintaining a working fluid pressure of 10,000 psi (700 kg/cm$^2$).

Pressurized fluid from a suitable pump is introduced to inlet opening 36 and whereupon the fluid further travels to inlet region 30. After a threshold pressure is obtained, surface 21 of poppet 16 is forced away from surface 28 of valve body 14 and the fluid flows through the annular flow path therebetween toward the discharge transition area 42. Upon reaching transition area 42 the fluid enters discharge opening 44 and exits discharge fitting 45 where the fluid is routed to a selected tool or a number of tools such as several water jetting lances.

Any changes in the pressure differential between inlet 36 and discharge opening 44, brought about for example the sudden shutting off of a jetting lance, or pulses from the pump pressurizing the inlet fluid will cause poppet 16 to move longitudinally and such motion will be dampened by actuator piston 62 and the restricted passage of gas through orifice 66.

It will be appreciated that the high pressure regulating valve of the present invention is well suited to carry out the advantages and to fulfill the shortcomings mentioned above as well as to provide advantages inherent in the disclosed valve. It will be further appreciated that various changes and modifications may be made to the disclosed valve without departing from the spirit and scope of the invention as claimed.

What is claimed is:

1. A pressure regulating valve comprising:
   a) a valve body having a longitudinal axis and a centrally located opening about the axis, the opening having at least a first inlet section and a second section, the second section forming an elongated tapered bore having a preselected taper angle with respect to the longitudinal axis defining a seat surface integral to the valve body, the bore having an inlet at a first end, and at least one discharge opening being in communication with the tapered bore at a preselected position along the valve body;
   b) a poppet being essentially centered about the longitudinal axis of the valve body and having a first leading tip portion, a second tapered portion, a third portion, and a fourth portion encompassing the remainder of the poppet, the second portion forming an elongated tapered poppet surface having a preselected taper angle with respect to the longitudinal axis which differs from the preselected taper angle of the seat surface in the valve body by a preselected amount, at least a portion of the first and second portion of the poppet being disposed within the second portion of the elongated tapered bore of the valve body thereby defining a flow path therebetween of a predetermined length with respect to the longitudinal axis;
   c) biasing means for biasing the poppet toward the seat; and
   d) means for limiting the movement of the poppet from the seat.

2. The valve of claim 1 wherein the difference in the taper of the seat in the valve body and the taper of the poppet surface is within the range of approximately 0 to 0.12 degrees.

3. The valve of claim 1 wherein the third portion of the poppet has at least one sub-portion thereof which is of a substantially straight cylindrical profile.

4. The valve of claim 1 wherein at least part of the third portion of the poppet is initially tapered and then transitions to an essentially straight cylindrical profile.

5. The valve of claim 1 wherein the surface of the second portion of the poppet has a taper of 1.5 degrees and the surface of the valve seat has a taper of 1.465 degrees.

6. The valve of claim 1 wherein a protective sleeve is positioned about at least a portion of the poppet for protecting the poppet from fluid flow induced damage.

7. The valve of claim 1 further comprising: guide means fitted about at least a portion of the third portion of the poppet for guiding the movement of the poppet within the valve body.

8. The valve of claim 1 wherein the biasing means comprises:
   a) an actuator housing associated with the valve body;
   b) a piston engaged with the poppet and disposed in the actuator housing in such a manner that a pressure chamber is defined between the piston and the housing; and
   c) a pressurized gas disposed in said pressure chamber to dampen the movement of the piston and poppet.

9. The valve of claim 8 wherein the piston further defines a damping chamber and is provided with orifice means for providing communication between the pressure chamber and the damping chamber.

10. The valve of claim 1 wherein the first leading tip portion of the poppet is conically shaped and has a taper angle with respect to the longitudinal axis by a preselected amount that exceeds the taper angle of the second portion of the poppet.

11. The valve of claim 1 wherein the piston has means for accommodating liquid fluid that may leak past the poppet.

12. The valve of claim 1 wherein the preselected flow path length is greater than the maximum diameter of the poppet.

13. The valve of claim 1 wherein the valve body is made of a stainless steel and the poppet is made of a stainless steel.

14. The valve of claim 1 wherein at least two discharge openings are located in the valve body in an opposing relationship.

15. A pressure regulating valve comprising:
   a) a valve body having a central longitudinal axis and an opening centrally located thereabout and extending through the valve body, the opening having at least a first inlet section and a second tapered section, the second section forming an elongated tapered bore having a preselected taper angle with respect to the central axis defining a seat surface integral to the valve body, the bore having an inlet opening at the a first section, and at least one outlet opening in communication with the tapered bore at a preselected position along the valve body;
   b) a poppet centered about the longitudinal axis and having at least a first leading tip portion having a preselected taper angle with respect to the longitudinal axis, a second tapered portion, a third portion, and a fourth portion defining the remainder of the poppet, the second portion forming an elongated tapered poppet surface having a preselected taper angle with respect to the longitudinal axis which differs from the preselected taper of the seat surface in the valve body by a preselected amount within the range of 0 to 0.12 degrees, the first and at least part of the second portion of the poppet being disposed within the second portion of the elongated tapered opening of the valve body thereby defining a flow path therebetween, the flow path being of a preselected length which exceeds the maximum diameter of the poppet;
   c) guide means associated with at least part of the poppet for guiding the poppet within the valve body;
   d) an actuator housing associated with the valve body;
   e) a piston engaged with the poppet and disposed in the actuator housing in such a manner that a pressure chamber is defined between the piston and the housing, and the piston defines a damping chamber which is provided with orifice means for providing communication between the pressure chamber and the damping chamber, and the piston has cavities for collecting fluid that may leak past the poppet;
   f) a pressurized gas disposed in said pressure chamber to force the piston toward the poppet;
   g) means for limiting the movement of the poppet with respect to the seat.

16. The valve of claim 15 wherein the third portion of the poppet has at least one subsection having an essentially straight cylindrical profile.

17. The valve of claim 15 wherein the third portion of the poppet is tapered initially before transitioning into at least one substantially straight cylindrical sub-section.

18. The valve of claim 15 wherein a protective sleeve is positioned about at least a part of the third portion of the poppet for protecting the poppet from fluid flow induced damage.

19. The valve of claim 15 wherein the angle of the tapered second portion of the poppet with respect to the centerline is up to 10% greater than the angle of the seat surface with respect to the centerline.

20. The valve of claim 15 wherein the valve body and the poppet are made of a stainless steel.

* * * * *